United States Patent
Peter

(10) Patent No.: US 6,302,949 B1
(45) Date of Patent: Oct. 16, 2001

(54) METALLIZED BISAZO DYES, THEIR PREPARATION AND USE

(75) Inventor: Heinz Peter, Fribourg (CH)

(73) Assignee: Ilford Imaging Switzerland GmbH, Marly (CH)

(*) Notice: Subject to any disclaimer, the term of this patent is extended or adjusted under 35 U.S.C. 154(b) by 0 days.

(21) Appl. No.: 09/376,828

(22) Filed: Aug. 18, 1999

(30) Foreign Application Priority Data

Aug. 19, 1998 (EP) .................................................. 98810798

(51) Int. Cl.[7] .............................. C09D 11/02; C09B 45/24
(52) U.S. Cl. ............................. 106/31.52; 106/31.48; 106/31.5; 534/602; 534/701; 534/719
(58) Field of Search .................... 106/31.52, 31.48, 106/31.5; 534/602, 701, 719

(56) References Cited

U.S. PATENT DOCUMENTS

| | | | |
|---|---|---|---|
| 4,626,284 | 12/1986 | Ohta et al. | 106/22 |
| 4,703,113 | 10/1987 | Baxter et al. | 534/796 |
| 4,963,189 | 10/1990 | Hindagolla | 106/22 |
| 5,376,151 | 12/1994 | Freeman et al. | 8/865 |
| 5,639,809 | 6/1997 | Matsuzaki et al. | 524/159 |
| 5,725,641 | 3/1998 | Macleod | 106/31 |
| 5,888,286 * | 3/1999 | Gregory et al. | 106/31.52 |
| 5,891,230 * | 4/1999 | Gregory et al. | 106/31.52 |
| 5,989,326 * | 11/1999 | Peter | 106/31.52 |

FOREIGN PATENT DOCUMENTS

| | | | |
|---|---|---|---|
| 310251 | 10/1955 | (CH) | |
| 900600 | 12/1953 | (DE) | |
| 1006098 | 4/1957 | (DE) | |
| 3236238 | 5/1984 | (DE) | C98D/45/24 |
| 0 342 241 | 11/1989 | (EP) | G02B/5/30 |
| 0 425 150 | 5/1991 | (EP) | C09D/11/00 |
| 0 593 324 | 4/1994 | (EP) | C09D/45/24 |
| 0 597 672 | 5/1994 | (EP) | C09D/11/00 |
| 0 632 105 | 1/1995 | (EP) | C09B/45/28 |
| 0 662 499 | 7/1995 | (EP) | C09D/11/10 |
| 0 688 830 | 12/1995 | (EP) | C09B/31/02 |
| 0 693 537 | 1/1996 | (EP) | C09B/62/513 |
| 686194 | 8/1930 | (FR) | |
| 1068476 | 6/1954 | (FR) | |
| 2132314 | 11/1972 | (FR) | |
| 2289473 | 11/1995 | (GB) | C09B/31/08 |

OTHER PUBLICATIONS von Dr. H. Pfitzner et al., "Die oxydative Kupferung von o–Oxy–azofarbstoffen", Angwe. Chem/70 Jan. 1958/Nr. 8.
G. Wyszecki et al., "Color Science Concepts & Methods, Quantitative Data and Formulae", John Wiley & Sons, 1982 (ISBN 0471–02106–7). No month.

* cited by examiner

Primary Examiner—Helene Klemanski

(57) ABSTRACT

Metallized bisazo dyes of general formula (IX)

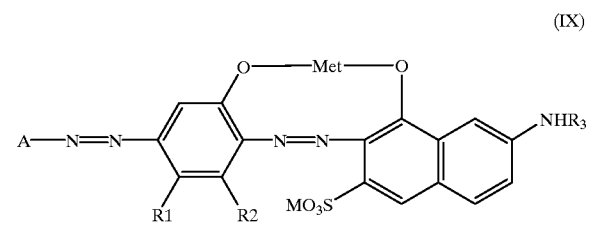

or of general formula (X)

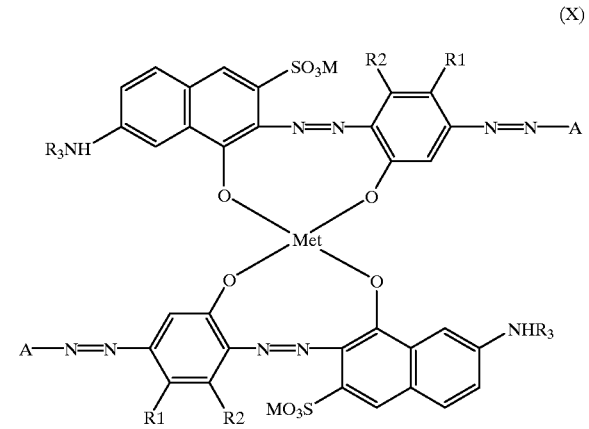

wherein A, $R_1$, $R_2$, $R_3$, M and Met are defined in the specification are excellent dyes for dying and printing cellulose containing materials and especially for the preparation of inks for ink jet printing.

10 Claims, No Drawings

METALLIZED BISAZO DYES, THEIR PREPARATION AND USE

FIELD OF THE INVENTION

The present invention relates to novel metallized black bisazo dyes useful in the dyeing of natural and synthetic materials or modified natural or synthetic materials, for example cellulose, pulp, paper, coated paper, cotton, wool, silk, leather, polyamides, polyesters, plastics, resins, varnishes, inks or in manufacturing of toners or pigments of the lake type. More particularly, the present invention relates to new, lightfast metallized black bisazo dyes and recording liquids containing these dyes for ink jet printing processes.

BACKGROUND OF THE INVENTION

Ink jet printing processes generally are of two types: continuous stream and drop-on-demand. In continuous stream ink jet printing systems, ink is emitted in a continuous stream under pressure through an orifice or nozzle. The stream is perturbed, causing it to break up into droplets at a fixed distance from the nozzle. At the break-up point, the droplets are charged in accordance with digital data signals and passed through an electrostatic field which adjusts the trajectory of each droplet in order to direct it to a specific location on a recording medium or to a waste ink collecting recipient. In the non-continuous process, or the so called "drop-on-demand" systems, a droplet is expelled from a nozzle to a position on a recording medium in accordance with digital data signals. A droplet is not formed or expelled unless it is to be placed on the recording medium.

The most important part of an ink used in ink jet printing are the dyes. Although a number of dyes have been proposed none has been produced which meets all the requirements of a modern printing process.

C.I. "Food Black 2" (formula I) and dyes having similar structures have been mentioned as black dyes for ink jet printing inks in JP Patent Application 59-093'766. These dyes, however have a somewhat bluish hue and give images with poor light fastness.

(I)

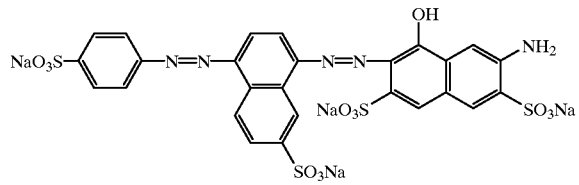

Reactive black dyes have also been proposed for ink jet printing for example in the Patent Application EP 0,693,537. However, inks containing dyes with incorporated reactive groups deteriorate the storage stability of the inks and due to their potential health risk they are not particularly suitable for handling in a non chemical environment.

Black type recording liquids using "Pacified Reactive Black Dyes" are described in U.S. Pat. No. 5,725,641. It relates to ink compositions comprising the metallized azo dye "Reactive Black 31" in either or both of its hydrolysed forms according to general formula (II)

(II)

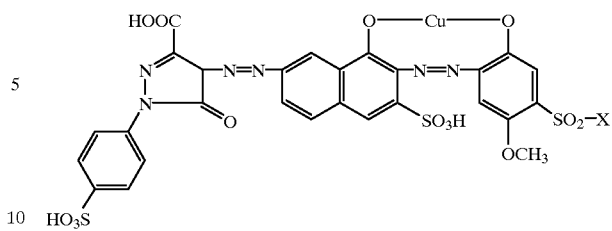

where X is $CH_2CH_2OH$ and/or $CH=CH_2$.

These inks are claimed to be lightfast and to possess reliable ink jet pen performance.

The pacification process is accomplished by making an aqueous solution of "Reactive Black 31". The aqueous solution is heated to 60° C. and the dye is hydrolysed by addition of sodium hydroxide in amounts sufficient to bring the pH of the solution to a range of about 8 to about 12. After the completion of the hydrolysis the pH of the solution is lowered to about 7 with hydrochloric acid. The recording liquids in U.S. Pat. No. 5,725,641 are required to contain less than 1 wt % of sulphate ions, preferably less than about 1000 parts per million. Thus the sulphate ions generated during the hydrolysis reaction and the chloride and sodium ions added during the process have to be removed in an additional purification step. Further, to compensate the reduced water solubility of the dyes of general formula (II) compared to the initial "Reactive Black 31", 10 to about 40 wt %, preferably 20 to about 25 wt %, of at least one organic solvent are required to provide inks with the claimed performance. Furthermore, on exposure to light, images on a range of recording materials suffer from colour shifts when printed with ink jet inks containing "Reactive Black 31" or "Pacified Reactive Black 31".

In Patent Application EP 0,662,499 ink jet inks using either metallized or non-metallized azo dyes are disclosed. Dyes preferentially used for black recording liquids were "Acid Black 51" (Formula III) and/or "Reactive Black 1" (Formula IV).

(III)

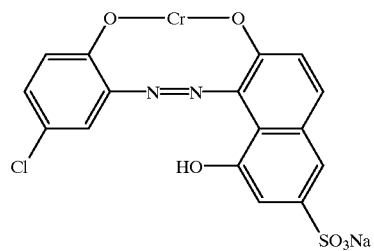

(IV)

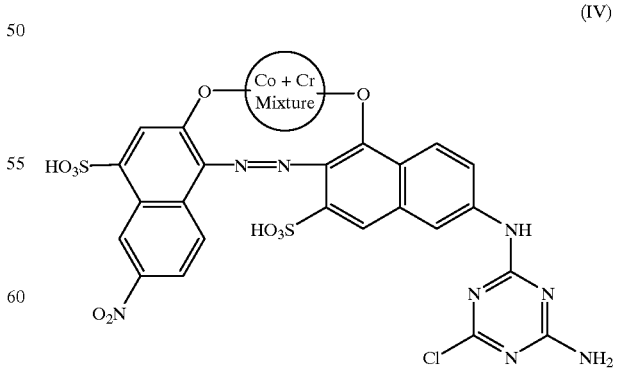

However, both of these black metallized azo dyes are based on metal ions, such as chromium ions, which are presently regarded by the United States Regulatory Authorities as priority pollutants.

In Patent Application DE 3,236,238 1:1 metallized bisazo dyes of general formula (V) are claimed as being useful for dyeing and printing of cellulose containing materials in blue shades

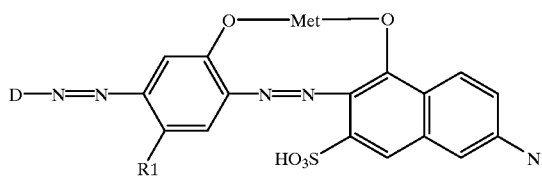

(V)

wherein D is substituted phenyl or naphthyl; $R_1$ is hydrogen, alkyl or alkoxy with 1 to 4 C atoms, $NHCONH_2$ or $NHCOR_3$ where $R_3$ is alkyl with 1 to 4 C atoms; $R_2$ is hydrogen or unsubstituted or substituted phenyl and Met is copper or nickel.

In Patent Application EP 0,632,105 metallized bisazo dyes of general formula (VI) are claimed as blue dyes for dying paper making material and cellulose fibres

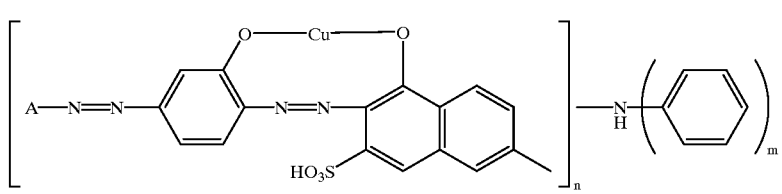

(VI)

wherein A represents phenyl or naphthyl having one or more sulpho groups; m is 0 or 1 with the proviso that m is 1 when n is 0 and m is 0 when n is 2.

In Patent Application EP 0,593,324 metallized bisazo dyes of general structure (VII) are claimed and polarising films having said dyes incorporated therein are described

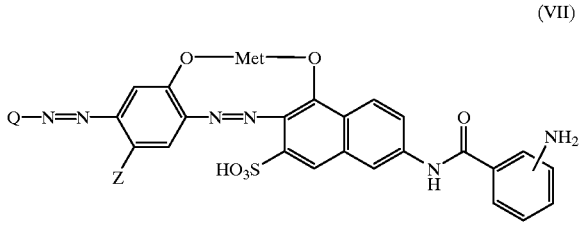

(VII)

wherein Met is copper, nickel, zinc or iron; Q is a substituted or unsubstituted phenyl or naphthyl group and Z is hydrogen, lower alkyl, lower alkoxy, sulpho, and substituted or unsubstituted amino. The hue of all these metallized dyes is greenish blue to blue.

In U.S. Pat. No. 5,639,809 polarising films containing metallized bisazo and trisazo dyes of general formula (VIII) have been described,

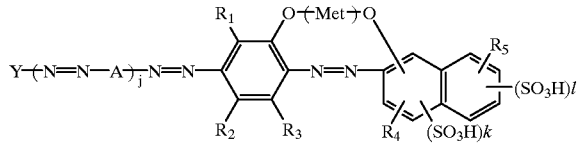

(VIII)

wherein Met represents copper, nickel, zinc or iron. However, all of the disclosed compounds are giving red to blue hues and yellow, red, orange or other dyes need to be added to provide a black colour.

Metallized azo dyes with structures mentioned above considered to be state of the art do not satisfy all the required demands when used in aqueous inks for ink jet printing.

Dyes used for such recording liquids have to be sufficiently soluble in water and typical ink liquids, should not show bronzing on recording materials (association of dye on the surface of the recording material), they have to be stable even when the recording liquid is stored for long periods of time, they need to provide printed images having high optical density, excellent water fastness and excellent light fastness. Various types of compositions have been proposed as inks for use in ink jet printing. Typical inks are composed of various types of dyes, water, organic solvents, cosolvents and other additives.

In particular the inks have to meet the following criteria:
(1) The ink gives high quality images on any type of recording medium.
(2) The ink gives printed images exhibiting excellent water fastness.
(3) The ink gives printed images exhibiting excellent light fastness.
(4) The ink does not clog jetting nozzles even when these are kept uncapped while recording is suspended.
(5) The ink is quickly fixed onto recording media without bronzing and can not therefore be scrubbed off.
(6) The ink can be stored for a long period of time without deterioration in its performance.
(7) Physical properties of the inks, such as viscosity, conductivity and surface tension, are each within a defined range.
(8) The recording liquid has to be safe, non toxic and not flammable.

DESCRIPTION OF THE INVENTION

The present invention relates to novel metallized bisazo dyes useful in black dyeing of natural and synthetic materials or modified natural or synthetic materials, for example cellulose, pulp, paper, coated paper, cotton, wool, silk, leather, polyamides. polyesters, plastics, resins, varnishes or for manufacturing of inks or toners or pigments of the lake type.

More particularly, this invention relates to novel metallized bisazo dyes suitable for inks for ink jet printing showing high solubility, providing reliable ink jet pen performance and forming images having neutral black colour, high optical density, excellent water fastness, excellent light stability and no or little association of dye on the surface of the recording material (bronzing). Another object of the present invention is to provide ink compositions for ink jet printing with excellent black ink dye properties on different ink receiving materials, such as plain paper, coated paper, sheets of synthetic materials or coated sheets of synthetic materials. A further object of the present invention is to provide ink compositions satisfying all of the commercial requirements (1) to (6).

According to a first aspect of the present invention there are provided novel black metallized bisazo dyes of general formula (IX)

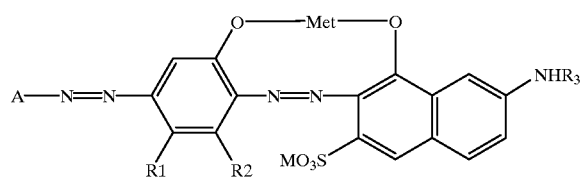

(IX)

or of general formula (X)

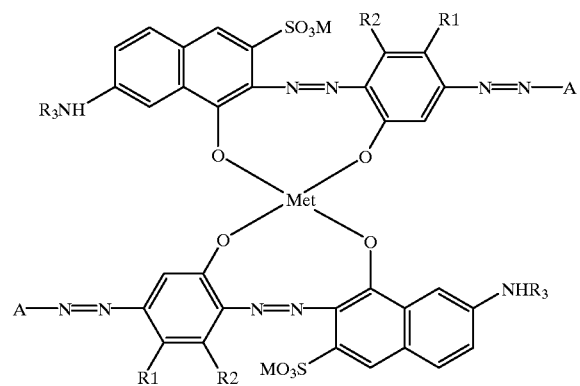

(X)

wherein
- A is unsubstituted or optionally substituted phenyl or unsubstituted or optionally substituted naphthyl;
- $R_1$ is hydrogen, alkyl, optionally substituted alkyl, alkoxy, optionally substituted alkoxy, all with 1 to 18 C atoms, amino, optionally substituted amino, halo, trifluoromethyl, carboxy, sulpho, carbamido, alkylcarbonylamino, arylcarbonylamino; or forms together with $R_2$ and the phenylene ring a 1,4-naphthylene moiety, which can be unsubstituted or substituted in position 6 or 7;
- $R_2$ is hydrogen or forms together with $R_1$ and the phenylene ring a 1,4-naphthylene moiety, which can be unsubstituted or substituted in position 6 or 7;
- $R_3$ is hydrogen, alkyl, optionally substituted alkyl, all with 1 to 18 C atoms, cycloalkyl, unsubstituted or optionally substituted heterocyclic alkyl, unsubstituted or optionally substituted aryl, unsubstituted or optionally substituted aralkyl, saturated and unsaturated aza and/or oxa and/or thia heterocyclic radicals;
- M is hydrogen, a metal cation, preferentially an alkali metal cation, an ammonium cation or an ammonium cation substituted with alkyl, alkoxyalkyl or hydroxyalkyl radicals each having 1 to 12 C atoms; and
- Met is Cu, Ni, Zn or Fe with the proviso that Met is Cu, Ni or Zn if the metallized bisazo dye is of general formula (IX) and Met is Fe if the metallized bisazo dye is of general formula (X).

When A is substituted phenyl it preferably carries from one to three substituents selected from the group consisting of sulpho, carboxy, carboxamido, N-substituted carboxamido as for example N-carboxymethylcarboxamido or N-(2-adipyl)-carboxamido; substituted or unsubstituted amino, alkylcarbonylamino, arylcarboxylamino; alkyl with 1 to 18 C atoms, preferably with 1 to 12 C atoms; substituted alkyl as for example trifluoromethyl, hydroxymethyl, carboxymethyl, sulphomethyl, phosphonomethyl, hydroxyethyl, carboxyethyl, cyanoethyl, 4-carboxybutyl; halogen, hydroxy, cyano, alkoxy with 1 to 18 C atoms, preferably with 1 to 12 C atoms; substituted alkoxy as for example 2-hydroxyethyloxy or ω-sulphoalkoxy; alkylthio, substituted alkylthio as for example ω-sulphoethylthio or ω-sulphopropylthio. It is still more preferred that when A is substituted phenyl one of its substituents is sulpho, carboxy, trifluoromethyl or alkyl with 1 to 12 C atoms and one or two substituents are selected from the group consisting of hydrogen, chloro, hydroxy, alkoxy or carboxy.

When A is substituted naphthyl it preferably carries from one to three substituents selected from the group consisting of sulpho, carboxy, nitro or hydroxy. It is preferred that the naphthyl is substituted by one to three sulpho groups, more preferably by one or two sulpho groups. When $R_1$ and $R_2$ together with the 1,4-phenylene moiety form a 1,4-naphthylene radical hydrogen or sulpho are the preferred substituents.

In a preferred embodiment of the invention $R_1$ is hydrogen, unsubstituted or substituted alkyl with 1 to 4 C atoms, unsubstituted or substituted alkoxy with 1 to 4 C atoms, unsubstituted or substituted amino, carbamido, alkylcarbonylamido or arylcarbonylamido.

In a preferred embodiment of the invention $R_3$ is hydrogen, alkyl with 2 to 6 C atoms, alkyl with 2 to 6 C atoms with substituents selected from the group consisting of hydroxy, alkoxy, halogen, amino, carboxy, carboxyalkyl, sulpho, cycloalkyl, heterocyclic alkyl, aryl or substituted aryl; aralkyl or substituted aralkyl. Especially preferred as $R_3$ is 2-sulphoethyl.

In a preferred embodiment of the invention Met is Cu or Fe.

The compounds of formulas (IX) and (X) may be in the free acid form or an inorganic or organic salt thereof. They are preferably in the form of their salts with cations such as alkali metal, ammonium or optionally substituted ammonium or mixtures of such cations. Examples of substituted ammonium cations include 2-hydroxyethylammonium, bis-(2-hydroxyethyl)-ammonium, tris-(2-hydroxyethyl)-ammonium, bis-(2-hydroxyethyl)-methyl-ammonium, tris-[2-(2-methoxyethoxy)-ethyl]-ammonium, 8-hydroxy-3,6-dioxaoctylammonium and tetraalkylammonium as for example tetramethylammonium or tetrabutylammonium.

It is to be understood that the present invention covers all tautomeric forms of the compounds of formulas (IX) and (X).

The present invention relates not only to compounds of formulas (IX) and (X), but also to mixtures comprising two or more compounds of formulas (IX) and (X) and mixtures of these with other dyes.

The compounds of the present invention are particularly useful in dyeing or printing of natural or synthetic polymeric materials or modified natural or synthetic materials, as for example cellulose, pulp, paper, coated paper, cotton, viscose, silk, leather, polyamides, polyesters, plastics, resins, varnishes or in manufacturing inks or toners or pigments of the lake type. The application methods are those generally applied in the industry for dyeing of or printing onto the various substrates.

A further embodiment of the invention is the use of liquid dye preparations containing at least one metallized bisazo dye of general structure (IX) or (X) or a mixture of such metallized bisazo dyes. These liquid dye preparations are preferred for the dying of paper. These stable, liquid, preferably aqueous, highly concentrated dye preparations may be prepared according to methods well known in the art. Such highly concentrated dye preparations are advantageously obtained during dye synthesis without the need to isolate the dye.

Metallized bisazo dyes of general formulae (IX) and (X) or mixtures thereof are excellent, highly soluble black dyes for the preparation of black recording liquids for ink jet printing processes. Recording liquids of the present invention provide reliable ink jet pen performance and form images with excellent black colour tone, excellent water fastness and excellent light fastness for a wide range of receiving materials used in ink jet printing.

A suitable ink comprises one or more metallized bisazo dyes according to the present invention and a liquid aqueous medium. The ink preferably contains from 0.5% to 20%, preferably from 0.5% to 8% by weight of a metallized bisazo dye of general formulae (IX) and/or (X) or mixtures of those dyes or mixtures with other dyes, based on the total weight of the ink. The liquid medium is preferably water or a mixture comprising water and water soluble or water miscible organic solvents or mixtures thereof and up to about 10%, preferably up to 5% of an additive independently selected from the group consisting of surfactant, buffer, biocide, stabiliser, polymers and mixtures thereof. Examples of suitable ink media are given for example in U.S. Pat. Nos. 4,626,284, 4,703,113, 4,963,189 and 5,725,641, GB Patent Application 2,289,473 and EP Patent Applications 0,425, 150 and 0,597,672.

The inks of the present invention give good print quality, runnabilities of over 500 ml in thermal printing heads and excellent refire performance.

Dye Synthesis

The compounds according to formulas (IX) or (X) can be prepared by methods well known in the art.

(I) An amine of general formula (XI)

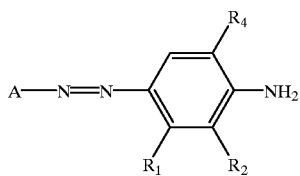

(XI)

wherein A, $R_1$ and $R_2$ are defined as above and $R_4$ is hydrogen, halogen, hydroxy or alkoxy, is diazotized by ordinary methods well known in the art, (ii) coupled under alkaline conditions with a compound of general formula (XII)

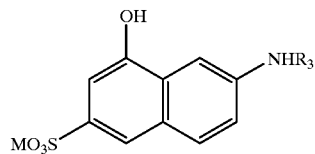

(XII)

wherein $R_3$ is as defined above, and (iii) metallizing the resulting bisazo dye of general formula (XIII)

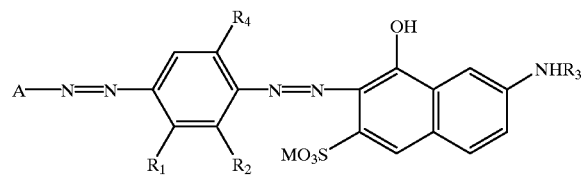

(XIII)

wherein A, $R_1$, $R_2$, $R_3$ and $R_4$ are as defined above.

Compounds of formula (XII) may be prepared according to Patent Application GB 2,289,473 by using the Bucherer Reaction, for example by reacting 1-hydroxy-3-sulpho-7-hydroxy (or 7-amino)-naphthalene with an amine $R_3NH_2$, wherein $R_3$ is as defined above, in the presence of an alkali metal or ammonium sulphite and/or bisulphite under heating at a temperature of 60° C. to 100° C.

Metallized bisazo dyes of general formulas (IX) or (X) can be prepared by various methods known in the art.

A: A bisazo compound of general formula (XIII), wherein $R_4$ is methoxy, when heated in the presence of cuprammonium sulphate and an alkanolamine undergoes a copper promoted dealkylation to give the corresponding Cu-metallized bisazo dye of general formula (IX).

B: A bisazo compound of general formula (XIII), wherein $R_4$ is halogen undergoes hydrolytic coppering to give the corresponding Cu-metallized bisazo dye of general formula (IX).

C: A further used method, known as oxidative coppering and described for example in Angewandte Chemie 70, 232, 1958), Patents DE 900,600 and DE 1,006,098, requires as starting material a bisazo compound of general formula (XIII), wherein $R_4$ is hydrogen.

D: Fe-metallized bisazo dyes of general formula (X) for example can be prepared according to U.S. Pat. No. 5,376,151 by reacting two equivalents of a compound of formula (XIII), wherein $R_4$ is hydroxy, with one equivalent of an Fe(II) or an Fe(III) salt at a slightly alkaline pH.

The following examples will illustrate the present invention in more detail, without limiting the scope of the claimed structures and ink compositions in any way.

In the examples, parts and percentages are given on the weight basis, and the sulphonic acid and carboxylic acid groups in the respective formulas are shown in the form of their sodium salts.

EXAMPLES

Example 1

Suspension A 22 parts of sodium nitrite were dissolved in 450 parts of water and 239 parts of 7-[(4-amino-3-methoxy-phenyl)azo]-1,3-naphthalenedisulphonic acid disodium salt, assay 47% (=Duasyn Agama®, available from Clariant Corporation, P.O. Box 69304, Charlotte, USA) were added. The resulting dispersion was added to a stirred solution of 207 parts of concentrated hydrochloric acid in 450 parts of ice/water in one hour and the temperature of the reaction mixture was kept at 0° C. to 5° C. The mixture was stirred for another two hours at 0° C. to 5° C. Afterwards the excess of nitrous acid was destroyed by reaction with sulfaminic acid.

Solution B 111 parts of N-(2-sulphoethyl) γ-acid sodium salt were dispersed in 450 parts of water, 8 parts of sodium dihydrogen phosphate were added and the pH was adjusted to 9 by addition of 20% sodium hydroxide solution. The resulting solution was cooled down to 0° C. to 5° C.

Preparation of the Non-metallized Dye

The suspension A was added to the solution B in 150 minutes while the reaction temperature was maintained at 0° C. to 5° C. and the pH at 9 by successive addition of 20% sodium hydroxide solution. After a further 45 minutes the resulting dispersion was allowed to warm to room temperature and stirring was continued for a further 15 hours. The precipitate was collected by filtration and dried. After purification in water/ethanol 221 parts of the non-metallized dye were obtained. The molar extinction coefficient in water at a wavelength of 577 nm was 34'000.

Preparation of the Metallized Dye According to Method A 5 parts of copper (II) sulphate pentahydrate were added to a solution of 4.9 parts of ethanolamine in 30 parts of water and the solution was stirred for 90 minutes. 17.7 parts of the non-metallized dye were added and the resulting dispersion was heated under stirring to 95° C. to 100° C. At this temperature the reaction mixture formed a homogeneous solution. After 135 minutes at 95° C. to 100° C. the reaction mixture was cooled down to 60° C., 24 parts of methanol were added and the mixture was cooled to room temperature. After filtration and drying 18.7 parts of metallized dye 19 were obtained. The molar extinction coefficient in water at a wavelength of 582 nm was 31'358.

Using appropriate starting materials the following copper-metallized bisazo dyes of general formula (IX) were prepared (sodium salts). They are listed in Table 1.

TABLE 1

| Dye No. | A | $R_1$ | $R_2$ | $R_3$ |
|---|---|---|---|---|
| 1 | 3-$MO_3S$-phenyl | —$OCH_3$ | —H | —H |
| 2 | 3-$MO_3S$-phenyl | —$CH_3$ | —H | —H |
| 3 | 3-MOOC-phenyl | —$CH_3$ | —H | —H |
| 4 | 3-MOOC-phenyl | —$NHCOCH_3$ | —H | —H |
| 5 | 4-MOOC-phenyl | —$CH_3$ | —H | —H |
| 6 | 3,5-di-MOOC-phenyl | —$CH_3$ | —H | —H |

TABLE 1-continued
| Dye No. | A | $R_1$ | $R_2$ | $R_3$ |
|---|---|---|---|---|
| 7 | 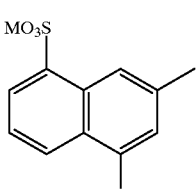 | —$CH_3$ | —H | —H |
| 8 | 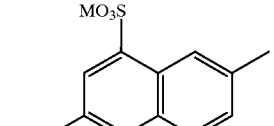 | —H | —H | —H |
| 9 | 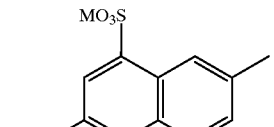 | —H | —H | —$CH_2CH_2OH$ |
| 10 | 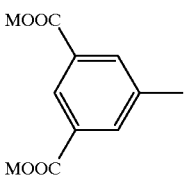 | —$CH_3$ | —H | 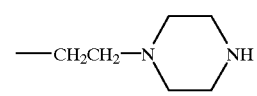 |
| 11 | 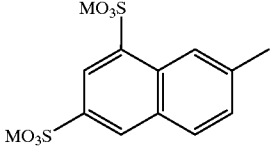 | —H | —H | 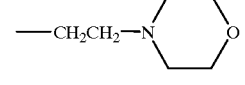 |
| 12 | 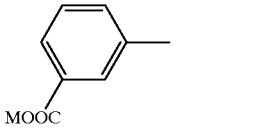 | —$NHCOCH_3$ | —H | —$CH_2CH_2COOM$ |
| 13 | 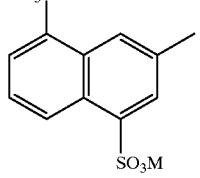 | —$CH_3$ | —H | —$CH_2CH_2CN$ |
| 14 | 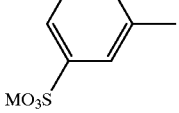 | —$OCH_3$ | —H | —$CH_2CH_2SO_3M$ |

TABLE 1-continued

| Dye No. | A | $R_1$ | $R_2$ | $R_3$ |
|---|---|---|---|---|
| 15 | 3-($MO_3S$)-phenyl | —$CH_3$ | —H | —$CH_2CH_2SO_3M$ |
| 16 | 5-($MO_3S$)-8-($SO_3M$)-3-methylnaphthalen-2-yl | —$CH_3$ | —H | —$CH_2CH_2SO_3M$ |
| 17 | 5-($MO_3S$)-8-($SO_3M$)-3-methylnaphthalen-2-yl | —$OCH_3$ | —H | —$CH_2CH_2SO_3M$ |
| 18 | 4,6-bis($MO_3S$)-7-methylnaphthalen-2-yl | —$CH_3$ | —H | —$CH_2CH_2SO_3M$ |
| 19 | 5,7-bis($MO_3S$)-3-methylnaphthalen-2-yl | —H | —H | —$CH_2CH_2SO_3M$ |
| 20 | 3-(MOOC)-phenyl | —$NHCOCH_3$ | —H | 4-(COOM)-phenyl |
| 21 | 3,5-bis(MOOC)-phenyl | —$CH_3$ | —H | 4-($CH_2COOM$)-phenyl |
| 22 | 5,7-bis($MO_3S$)-3-methylnaphthalen-2-yl | —H | —H | 4-($CH_2COOM$)-phenyl |

TABLE 1-continued

| Dye No. | A | $R_1$ | $R_2$ | $R_3$ |
|---|---|---|---|---|
| 23 | 3-methyl-1,5-disulfonaphthyl (MO$_3$S at 1, SO$_3$M at 5, CH$_3$ at 7) | —CH$_3$ | —H | 4-(CH$_2$SO$_3$M)phenyl |

Example 2
Preparation of the Metallized Dye According to Method C 2 parts of copper (II) acetate monohydrate were added to a solution of 2.44 parts of ethanolamine in 50 parts of water. After heating to 60° C. 7.2 parts of the non-metallized dye were added and stirring was continued for 15 minutes. Then 11.4 parts of hydrogen peroxide (30%) were added over a period of 30 minutes and stirring was continued for a further 15 minutes. The reaction mixture was heated to 80° C. and 50 parts of sodium acetate in 50 parts of water were added. The solution was cooled down to 25° C. and the precipitate was collected by filtration. After drying 8.3 parts of metallized dye 24 were obtained. The molar extinction coefficient in water at a wavelenght of 551 nm was 8271. Dialysis gave a product with a molar extinction coefficient of 14'149.

Using appropriate starting materials the following copper-metallized azo dyes of general formula (IX) were prepared (sodium salts), where $R_1$ and $R_2$ and the 1,4-phenylene ring form a 1,4-naphthylene moiety. They are listed in Table 2.

TABLE 2

| Dye No. | A | $R_1$ $R_2$ | $R_3$ |
|---|---|---|---|
| 24 | 3-(MO$_3$S)phenyl | (forms 1,4-naphthylene with SO$_3$M) | —H |
| 25 | 3-(MOOC-CH$_2$CH$_2$)phenyl | (forms 1,4-naphthylene with SO$_3$M) | —CH$_2$CH$_2$SO$_3$M |
| 26 | 3,5-bis(MOOC)phenyl | (forms 1,4-naphthylene with SO$_3$M) | —CH$_2$CH$_2$SO$_3$M |
| 27 | 3,5-bis(MOOC)phenyl | (forms 1,4-naphthylene with MO$_3$S) | —CH$_2$CH$_2$SO$_3$M |
| 28 | 2-Cl-6-(MOOC)phenyl | (forms 1,4-naphthylene with SO$_3$M) | —CH$_2$CH$_2$CN |

TABLE 2-continued

| Dye No. | A | R₁ R₂ | R₃ |
|---|---|---|---|
| 29 | 1-SO₃M, 3-methyl, 5-SO₃M naphthalene | phenyl-SO₃M | —CH₂CH₂SO₃M |
| 30 | 2,5-dichloro-4-SO₃M phenyl | phenyl-SO₃M | —CH₂CH₂SO₃M |
| 31 | 3-SO₃M phenyl | phenyl-SO₃M | —CH₂CH₂SO₃M |

The following iron-metallized dye of general formula (X) of Table 3 was prepared (sodium salt) according to the method described in U.S. Pat. No. 5,376,151.

TABLE 3

| Dye No | A | R₁ | R₂ | R₃ |
|---|---|---|---|---|
| 32 | 1-SO₃M, 3-methyl naphthalene | —CH₃ | —H | —CH₂CH₂SO₃M |

Preparation Example of Inks

The present invention in so far as it relates to inks is further illustrated by using metallized bisazo dyes according to our invention as listed in Tables 1 to 3. 100 g of each ink were prepared by heating the dye (3–7 g), 2 g of glycerol, 1.0 g of 2-pyrrolidone and 1.2 g of a biocide solution (Promexal X50, available from Zeneca, Manchester, England) together with water to a temperature of approximately 50° C. under stirring for one hour to make a solution, cooling it down to 20° C., adjusting the pH to 7.5 and passing the solution through a Millipore® filter of 0.5 µm pore diameter. The dye quantity was adjusted in a way that the printed density was the same for all inks.

Application Example of Inks

To evaluate their printing performance the inks were printed with a HP560 ink jet printer onto the receiving media Ilfojet Standard Media Clear Film SMCF7 and Ilfojet Standard Media Glossy SMGP7, both available from Ilford Imaging Switzerland GmbH, Fribourg, Switzerland, and onto the receiving medium Epson Photo Quality Glossy Film S041071, available from Seiko Epson Corporation, Japan.

Comparative Application Example C-1 of Inks

An ink using "Pacified Reactive Black 31" according to formula (II), where X is CH₂CH₂OH, was prepared as described above.

Comparative Application Example C-2 of Inks

The commercially available original black ink was printed with an EPSON Stylus 500 ink jet printer onto the receiving medium Epson Photo Quality Glossy Film S041071. The evaluation methods for (A) dye solubility, (B) colour co-ordinates, (C) smudge resistance and (D) light fastness are as follows:

(A) Dye Solubility

The dye was dispersed or solubilised in deionised water and the dispersion or solution was stirred for one hour at 50°

C. The mixture was cooled down to 20° C., centrifuged and filtered. The solubility of the dye was calculated a) from UV/VIS spectral data of the mother liquor (solution) or b) based on the dried filter residue. The upper solubility limit that can be determined in this way is 20 g per 80 g of water.
(B) Colour Co-ordinates L*a*b*-values were measured directly on printed samples on opaque media using a Gretag SPM 100 spectrometer, available from Gretag AG, Regensdorf, Switzerland. On transparent media values of CIE-XYZ were measured on a Gretag-Macbeth Spectrolino Spectrascan spectrometer, available from Gretag AG, Regensdorf, Switzerland. L*a*b*-values were calculated as described in G. Wyszecki and W. S. Stiles, "Color Science: Concepts and Methods, Quantitative Data and Formulae", John Wiley and Sons 1982, page 829 (ISBN 0-471-02106-7).
(C) Smudge Resistance The smudge behaviour was evaluated by determining the degree of smear of the dye in images printed as described above according to the following criteria:
⊕:Little or no smear
◊:Slight smear
Ø:Severe smear
(D) Light Stability The printed samples were irradiated in an Atlas Ci35A Weather-O-Meter® with a 6500 W Xenon lamp until a total illumination of 40 kJoule/cm$^2$ was reached. The loss of density was measured with an X-Rite® densitometer at an originally printed density of about 1 and is expressed as % loss of initial density measured visually and for the blue (yellow), green (magenta) and red (cyan) spectral region.

Dye solubilities determined as described above were above 20 g per 80 g of water the metallized bisazo dyes 19 and 20. The metallized bisazo dyes according to our invention are therefore very well suited as dyes for ink jet printing.

The absorption maxima in water and the results of the tests (B) to (D) are given in Table 4 for the metallized bisazo dyes according to our invention and the previously known black metallized bisazo dye of comparative ink C-1 printed onto Ilfojet Standard Media Clear Film SMCF7.

TABLE 4

| Dye No. | $\lambda_{max}$ in water (nm) | L*a*b* values | Smudge Value | % Density loss ||||
|---|---|---|---|---|---|---|---|
| | | | | Vis | Yellow | Magenta | Cyan |
| 1 | 584 | 10.7/14.9/17.9 | ⊕ | 11.0 | 15.3 | 4.5 | 22.2 |
| 2 | 578 | 2.7/3.9/8.3 | ⊕ | 5.6 | 7.0 | 3.8 | 8.7 |
| 3 | 577 | 4.7/6.7/11.7 | ◊ | 8.2 | 4.7 | 5.0 | 12.8 |
| 4 | 567 | | Ø | 2.1 | −1.5 | 3.0 | 3.3 |
| 5 | 574 | 2.5/3.3/8.6 | Ø | 10.1 | 6.8 | 6.3 | 15.9 |
| 6 | 565 | | ⊕ | 6.2 | 6.1 | 6.6 | 7.3 |
| 7 | 586 | 2.8/4.7/7.5 | ⊕ | 12.0 | 10.2 | 6.7 | 17.1 |
| 8 | 572 | | ⊕ | 1.0 | 6.5 | 0.0 | 4.3 |
| 9 | 577 | | ◊ | −10.1 | 2.1 | −6.4 | −11.8 |
| 10 | 568 | | Ø | −2.9 | −10.5 | −6.1 | 2.2 |
| 11 | 592 | | Ø | 10.2 | 13.2 | 11.5 | 9.6 |
| 12 | 589 | | Ø | −5.6 | −3.0 | −6.5 | −8.1 |
| 13 | 592 | 1.4/2.5/3.8 | ◊ | 5.6 | 13.4 | 6.3 | 7.1 |
| 14 | 614 | 2.7/6.2/6.2 | ⊕ | −1.1 | 7.4 | −2.7 | 4.0 |
| 15 | 568 | | ◊ | 8.3 | 13.1 | 11.7 | 7.3 |
| 16 | 594 | | Ø | −5.6 | −3.0 | −6.5 | −8.1 |
| 17 | 602 | | ◊ | −1.1 | −5.3 | 0.0 | 0.0 |
| 18 | 588 | | ◊ | 8.3 | 13.1 | 11.7 | 7.3 |
| 19 | 582 | 1.7/1.6/3.6 | ◊ | 4.2 | 8.6 | 5.3 | 7.5 |
| 20 | 581 | | ◊ | 6.7 | 14.0 | 6.5 | 6.4 |
| 21 | 586 | | ◊ | 3.6 | 8.2 | 7.7 | 1.8 |
| 22 | 582 | | ◊ | 7.5 | 15.1 | 13.6 | 5.1 |
| 23 | 575 | | ◊ | 17.0 | 17.6 | 14.1 | 19.8 |
| 24 | 551 | | Ø | −3.4 | −17.9 | −11.0 | 3.7 |
| 25 | 575 | | Ø | 20.2 | 17.9 | 18.3 | 24.8 |
| 26 | 550 | | Ø | −11.1 | −15.3 | −14.0 | −3.9 |
| 27 | 556 | | Ø | 11.8 | 9.3 | 9.3 | 13.2 |
| 28 | 577 | | Ø | 26.2 | 21.1 | 23.9 | 31.1 |
| 29 | 570 | 0.7/0.6/0.4 | ◊ | 2.2 | −2.0 | −1.0 | 6.8 |
| 30 | 610 | | ⊕ | 1.1 | 0.0 | −1.1 | 5.8 |
| 31 | 541 | | ◊ | 2.7 | −0.8 | 0.8 | 3.9 |
| C-1 | 541 | 1.8/1.4/1.4 | ⊕ | 7.3 | 5.3 | 7.2 | 7.6 |

The results of the tests (B) to (D) are given in Table 5 for the metallized bisazo dyes according to our invention and the previously known black metallized bisazo formula (II) of comparative ink C-1 for images printed onto Ilfojet Standard Media Glossy SMGP7.

TABLE 5

| Dye No. | L*a*b* - values | Smudge value | % Density loss ||||
|---|---|---|---|---|---|---|
| | | | Vis | Yellow | Magenta | Cyan |
| 1 | 15.8/−19.2/−3.0 | ⊕ | 9.8 | 12.0 | 7.1 | 14.8 |
| 2 | 5.8/−1.9/−6.5 | ◊ | 8.2 | 5.7 | 7.6 | 5.0 |
| 3 | 20.5/1.4/−6.8 | ◊ | 1.1 | 2.5 | 1.2 | 4.3 |
| 4 | 10.6/0.7/−0.1 | Ø | 28.0 | 41.3 | 29.5 | 21.5 |
| 5 | 5.4/1.3/−7.1 | ◊ | 0.8 | −1.0 | 0.0 | 4.7 |
| 6 | 2.1/0.5/−7.1 | ⊕ | −5.7 | −8.5 | −5.8 | −2.8 |
| 7 | 5.7/−7.9/−5.2 | ⊕ | −2.1 | −1.1 | −3.4 | 1.0 |
| 8 | 1.2/0.7/−1.9 | ⊕ | −11.2 | −6.3 | −10.6 | −5.6 |
| 9 | 1.0/0.6/−1.2 | ◊ | 9.7 | −10.2 | −8.6 | −9.8 |
| 10 | 21.5/2.5/−7.2 | Ø | −8.7 | −18.5 | −11.1 | −4.4 |
| 11 | 4.2/−5.4/−4.3 | Ø | −2.1 | 0.0 | −2.3 | 0.0 |
| 12 | 6.5/−1.5/1.1 | Ø | 2.0 | −2.1 | 1.1 | 2.0 |
| 13 | 1.2/−1.8/−1.0 | ⊕ | 0.9 | 0.0 | 0.0 | 1.8 |
| 14 | 4.2/−12.3/1.2 | ⊕ | −1.1 | 0.0 | −2.4 | 1.0 |

TABLE 5-continued

| Dye No. | L*a*b* - values | Smudge value | % Density loss |  |  |  |
|---|---|---|---|---|---|---|
|  |  |  | Vis | Yellow | Magenta | Cyan |
| 15 | 6.2/−5.2/−9.3 |  | 2.9 | 3.2 | 2.6 | 4.8 |
| 16 |  |  | 2.3 | 1.2 | 2.4 | 2.2 |
| 17 | 7.2/−0.4/−2.5 | ◊ | 4.1 | −16.3 | −6.3 | 0.0 |
| 18 | 2.1/−0.6/−1.4 | ◊ | −9.4 | −8.2 | −8.0 | −9.2 |
| 19 | 0.8/0.7/−1.3 | ⊕ | 0.0 | 1.1 | 1.0 | 1.0 |
| 20 | 2.3/−2.3/−0.9 | ⊕ | −13.0 | −7.8 | −12.0 | −12.0 |
| 21 | 1.7/0.2/−1.5 | ◊ | 0.0 | 1.1 | 3.9 | −0.9 |
| 22 | 0.6/0.2/−0.6 | ∅ | 9.2 | 9.1 | 13.0 | 8.7 |
| 23 | 7.5/−6.4/4.6 | ◊ | 5.0 | 3.3 | 3.2 | 8.7 |
| 24 | 2.9/0.7/0.2 | ∅ | −26.0 | 44.8 | −34.0 | −14.4 |
| 25 | 3.6/0.1/−0.3 | ∅ | −4.4 | −9.2 | −5.6 | −3.2 |
| 26 | 1.3/0.1/−0.1 | ∅ | −23.0 | −35.0 | −26.2 | −15.7 |
| 27 | 8.9/10.9/2.9 | ∅ | 4.4 | −5.5 | 0.0 | 9.5 |
| 28 | 6.9/0.7/0.0 | ∅ | −11.0 | −16.3 | −13.2 | −5.5 |
| 29 | 3.0/0.0/0.5 | ◊ | −14.3 | −28.1 | −20.4 | −7.1 |
| 30 | 2.7/1.0/−0.9 | ◊ | −2.7 | −6.6 | −3.6 | −0.9 |
| 31 | 2.9/0.6/0.4 | ◊ | −1.9 | −5.7 | −3.8 | −1.9 |
| C-1 | 1.1/3.0/0.3 | ⊕ | −10.8 | −12.0 | −10.8 | −5.3 |

The results of the tests (B) to (D) are given in Table 6 for the metallized bisazo dyes according to our invention and comparative inks C-1 and C-2 for images printed on Epson Photo Quality Glossy Film S041071.

TABLE 6

| Dye No. | L*a*b* - values | Smudge value | % Density loss |  |  |  |
|---|---|---|---|---|---|---|
|  |  |  | Vis | Yellow | Magenta | Cyan |
| 1 | 17.0/−9.2/−9.1 | ◊ | 30.8 | 29.9 | 27.8 | 35.6 |
| 2 | 10.5/3.1/−6.5 | ∅ | 16.2 | 15.4 | 15.0 | 24.0 |
| 3 | 26.6/10.0/2.7 | ∅ | 16.7 | 17.3 | 17.8 | 14.4 |
| 4 | 5.7/1.0/1.1 | ∅ | 8.7 | 5.3 | 8.4 | 11.7 |
| 5 | 9.0/5.5/−6.3 | ∅ | 32.6 | 22.1 | 27.9 | 41.5 |
| 6 | 7.7/4.3/−9.8 | ∅ | 28.2 | 18.5 | 26.8 | 36.1 |
| 7 | 7.4/2.2/−6.8 | ∅ | 12.2 | 6.6 | 8.6 | 19.2 |
| 8 | 6.8/3.2/−4.4 | ∅ | 8.7 | 3.6 | 8.1 | 13.7 |
| 9 | 9.4/2.0/−9.6 | ⊕ | 3.3 | 9.6 | 6.5 | 11.1 |
| 10 | 7.7/3.8/−6.0 | ∅ | 6.6 | −1.1 | 2.9 | 13.9 |
| 11 | 7.1/2.4/−1.8 | ∅ | 4.5 | 3.1 | 0.0 | 11.2 |
| 12 | 7.8/−1.1/−10.0 | ⊕ | 17.1 | 10.6 | 13.0 | 18.3 |
| 13 | 7.9/4.5/−10.0 | ⊕ | 17.0 | 23.6 | 19.1 | 23.1 |
| 14 | 12.0/−8.1/−10.3 | ⊕ | 25.6 | 29.1 | 25.3 | 27.0 |
| 16 |  |  | 4.3 | 5.7 | 4.0 | 6.3 |
| 17 | 3.0/−1.2/−0.4 | ∅ | 6.5 | 4.3 | 8.8 | 5.2 |
| 18 | 10.3/−0.8/−10.1 | ⊕ | 15.5 | 23.6 | 17.0 | 20.4 |
| 19 | 9.9/1.8/−11.6 | ⊕ | 4.7 | 7.6 | 3.9 | 12.6 |
| 20 | 7.1/−2.1/−7.5 | ⊕ | 19.4 | 18.7 | 14.8 | 25.4 |
| 21 | 9.0/1.4/−11.0 | ⊕ | 5.9 | 3.6 | 6.2 | 12.6 |
| 22 | 15.7/2.0/−9.1 | ⊕ | 4.2 | 3.6 | 6.1 | 6.3 |
| 23 | 10.8/0.2/−5.9 | ∅ | 26.9 | 23.3 | 23.0 | 34.6 |
| 24 | 0.9/0.3/−0.3 | ∅ | 7.0 | 2.7 | 6.8 | 9.8 |
| 25 | 2.9/0.2/−5.3 | ∅ | 7.3 | 2.9 | 6.5 | 10.9 |
| 26 | 10.3/−1.0/−2.5 | ∅ | −24.1 | −25.5 | −27.8 | −12.8 |
| 27 | 13.7/7.7/2.1 | ∅ | 32.4 | 18.3 | 25.9 | 41.1 |
| 28 | 6.5/−0.6/−3.7 | ∅ | 1.0 | −3.1 | 0.0 | 3.0 |
| 29 | 10.8/1.0/−7.1 | ⊕ | 13.0 | 3.4 | 10.9 | 18.7 |
| 30 | 12.7/2.4/−11.7 | ⊕ | 18.7 | 10.8 | 15.2 | 24.7 |
| 31 | 11.2/1.7/−8.7 | ⊕ | 10.5 | 5.4 | 8.3 | 15.2 |
| C-1 | 10.1/4.6/−8.1 | ⊕ | −18.2 | −4.3 | −14.3 | −24.4 |
| C-2 | 4.4/2.8/−4.3 |  |  | 13.3 | 15.1 | 22.9 |

The metallized bisazo dyes according to our invention show a neutral black hue and they do not show a pronounced colour shift upon exposure to light. Hues are similar on the three test materials. Metallized bisazo dyes 2, 13, 14, 16, 19 and 22 according to our invention are especially advantageous. Images printed with inks containing these dyes show a much smaller hue shift after exposure to light than the comparative inks C-1 and C-2.

What is claimed is:

1. Metallized bisazo dyes of general formula (IX)

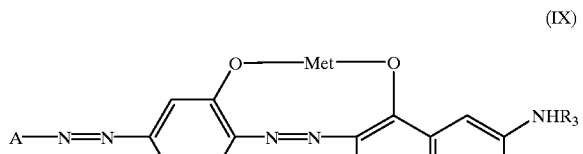

(IX)

or of general formula (X)

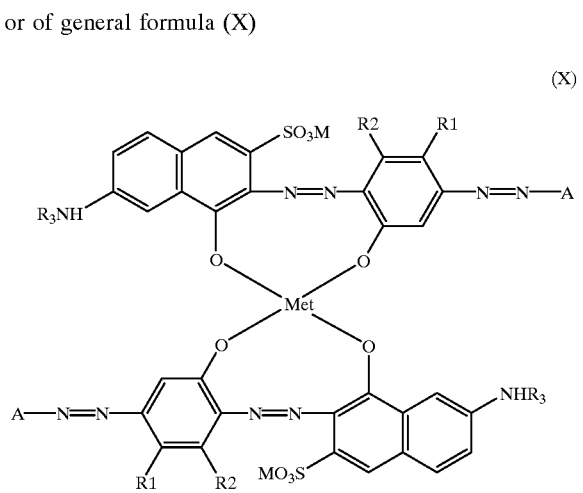

(X)

wherein

A is unsubstituted or optionally substituted phenyl or unsubstitited or optionally substituted naphthyl;

$R_1$ is hydrogen, alkyl, optionally substituted alkyl, alkoxy, optionally substituted alkoxy, all with 1 to 18 C atoms, amino, optionally substituted amino, halogen, trifluoromethyl, carboxy, sulpho, carbamido, alkylcarbonylamino, arylcarbonylamino; or forms together with $R_2$ and the phenylene ring a 1,4-naphthylene moiety, which can be unsubstituted or substituted in position 6 or 7;

$R_2$ is hydrogen or forms together with $R_1$ and the phenylene ring a 1,4-naphthylene moiety, which can be unsubstituted or substituted in position 6 or 7;

$R_3$ is alkyl, optionally substituted alkyl, all with 1 to 18 C atoms, cycloalkyl, unsubstituted or optionally substituted heterocyclic alkyl, unsubstituted or optionally substituted aryl, unsubstituted or optionally substituted aralkyl, saturated and unsaturated aza and/or oxa and/or thia heterocyclic radicals;

M is hydrogen, a metal cation selected from the group consisting of an alkali metal cation, an ammonium cation or an ammonium cation substituted with alkyl, alkoxyalkyl or hydroxyalkyl radicals each having 1 to 12 C atoms; and Met is Cu, Ni, Zn or Fe with the proviso that Met is Cu, Ni or Zn if the metallized bisazo dye is of general formula (IX) and Met is Fe if the metallized bisazo dye is of general formula (X).

2. Metallized bisazo dyes according to claim 1 wherein A is phenyl with one to three substituents selected from the group consisting of sulpho, carboxy, unsubstituted or substituted carboxamido, substituted or unsubstituted amino, alkylcarbonylamino, arylcarboxylamino, cyano, halogen, alkyl with 1 to 18 C atoms, alkyl substituted with cyano, carboxy, carboxyalkyl, sulpho or alkoxy; or A is naphthyl with one to three substituents selected from the group consisting of sulpho, carboxy, nitro or hydroxy; and $R_1$, $R_2$, $R_3$, M and Met are as defined in claim 1.

3. Metallized bisazo dyes according to claim 1 wherein $R_3$ is alkyl with 2 to 6 C atoms, alkyl with 2 to 6 C atoms with substituents selected from the group consisting of hydroxy, alkoxy, halo, amino, carboxy, carboxyalkyl, sulpho, cycloalkyl, heterocyclic alkyl, aryl or substituted aryl; aralkyl or substituted aralkyl; and A, $R_1$, $R_2$, M and Met are as defined in claim 1.

4. Metallized bisazo dyes according to claim 1 wherein $R_3$ is 2-sulphoethyl and A, $R_1$, $R_2$, M and Met are as defined in claim 1.

5. Metallized bisazo dyes according to claim 1 wherein $R_1$ is hydrogen, unsubstituted or optionally substituted alkyl with 1 to 4 C atoms, unsubstituted or substituted alkoxy having 1 to 4 C atoms, unsubstituted or substituted amino, carbamido, alkylcarbonylamino or arylcarbonylamino; and A, $R_2$, $R_3$, M and Met are as defined in claim 1.

6. Metallized bisazo dyes according to claim 1 wherein Met is Cu or Fe; and A, $R_1$, $R_2$, $R_3$ and M are as defined in claim 1.

7. A process for preparing a metallized bisazo dye according to claim 1 by (i) diazotizing an amine of general formula (XI)

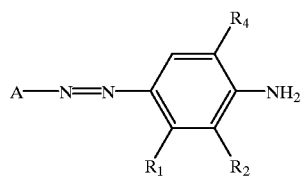

(XI)

wherein

A, $R_1$ and $R_2$ are defined as in claim 1 and $R_4$ is hydrogen, halo, hydroxy or alkoxy, (ii) coupling under alkaline conditions with a compound of general formula (XII)

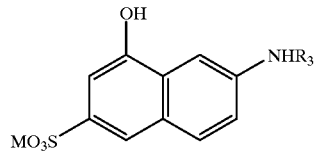

(XII)

wherein $R_3$ is as defined in claim 1, and (iii) metallizing the resulting bisazo dye of general formula (XIII)

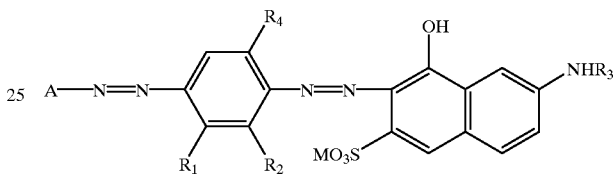

(XIII)

8. A process for dying or printing of materials comprising applying metallized bisazo dyes according to claim 1 on the material; wherein said material is selected from the group consisting of cellulose containing materials, pulp, paper, cotton, viscose, leather, silk, wool, polyamides and polyesters.

9. Liquid dye preparations containing at least one metallized bisazo dye or a mixture of metallized bisazo dyes as claimed in claim 1.

10. Inks for ink jet printing containing at least one metallized bisazo dye or a mixture of metallized bisazo dyes as claimed in claim 1.

* * * * *

UNITED STATES PATENT AND TRADEMARK OFFICE
CERTIFICATE OF CORRECTION

PATENT NO. : 6,302,949 B1 Page 1 of 1
DATED : October 16, 2001
INVENTOR(S) : Peter It is certified that error appears in the above-identified patent and that said Letters Patent is hereby corrected as shown below:

<u>Title page,</u>
Item [74], insert -- *(74) Attorney, Agent or Firm* - Dara L. Onofrio, Esq. --

<u>Column 7,</u>
Line 5, after viscose insert -- wool --.

Signed and Sealed this

Sixteenth Day of July, 2002

*Attest:*

JAMES E. ROGAN
*Attesting Officer*  *Director of the United States Patent and Trademark Office*